United States Patent
Herold et al.

(10) Patent No.: US 12,424,945 B2
(45) Date of Patent: Sep. 23, 2025

(54) INVERTER, METHOD FOR CONFIGURING AN INVERTER, METHOD FOR CONTROLLING AN INVERTER AND CORRESPONDING COMPUTER PROGRAM FOR PREVENTING AN OVERHEATING OF A DC LINK CAPACITOR

(71) Applicant: Valeo Siemens eAutomotive Germany GmbH, Erlangen (DE)

(72) Inventors: Christian Herold, Erlangen (DE); Alexander Rambetius, Erlangen (DE)

(73) Assignee: Valeo Siemens eAutomotive Germany GmbH, Erlangen (DE)

( * ) Notice: Subject to any disclaimer, the term of this patent is extended or adjusted under 35 U.S.C. 154(b) by 413 days.

(21) Appl. No.: 17/454,134

(22) Filed: Nov. 9, 2021

(65) Prior Publication Data

US 2022/0149748 A1 May 12, 2022

(30) Foreign Application Priority Data

Nov. 11, 2020 (DE) ...................... 10 2020 214 150.9

(51) Int. Cl.
*H02M 7/483* (2007.01)
*H02M 1/32* (2007.01)
(Continued)

(52) U.S. Cl.
CPC ........... *H02M 7/4835* (2021.05); *H02M 1/32* (2013.01); *H02M 1/327* (2021.05);
(Continued)

(58) Field of Classification Search
CPC ...... H02M 7/4835; H02M 1/32; H02M 1/327; H02M 7/5387; H02M 7/5395; H02M 7/539
See application file for complete search history.

(56) References Cited

U.S. PATENT DOCUMENTS 6,014,497 A * 1/2000 Kerkman .......... H02M 7/53875
388/811
6,020,696 A * 2/2000 Matsunaga ............. B60L 50/60
318/717
(Continued)

FOREIGN PATENT DOCUMENTS

DE 102012213908 A1 2/2014
DE 102017113886 A1 1/2018
(Continued)

OTHER PUBLICATIONS

German Search Report issued in corresponding German Application No. 10 2020 214 150.9, dated Jun. 30, 2021 (10 pages).
(Continued)

*Primary Examiner* — Yusef A Ahmed
(74) *Attorney, Agent, or Firm* — Osha Bergman Watanabe & Burton LLP

(57) ABSTRACT

An inverter having input terminals, output terminals, a DC link capacitor connected to the input terminals and configured to smooth a DC voltage present at the input terminals is disclosed. Controllable switches are connected to the DC link capacitor and to the output terminals, and a control device is also provided. The control device controls the controllable switches such that the controllable switches convert the DC voltage into an AC voltage at the output terminals. The controllable switches are controlled according to a first switching control scheme including a first modulation technique and a first switching frequency, and according to a second switching control scheme in response to a temperature of the DC link capacitor, the second switching control scheme causing less losses in the DC link capacitor than the first switching control scheme.

10 Claims, 2 Drawing Sheets

Figure 1:
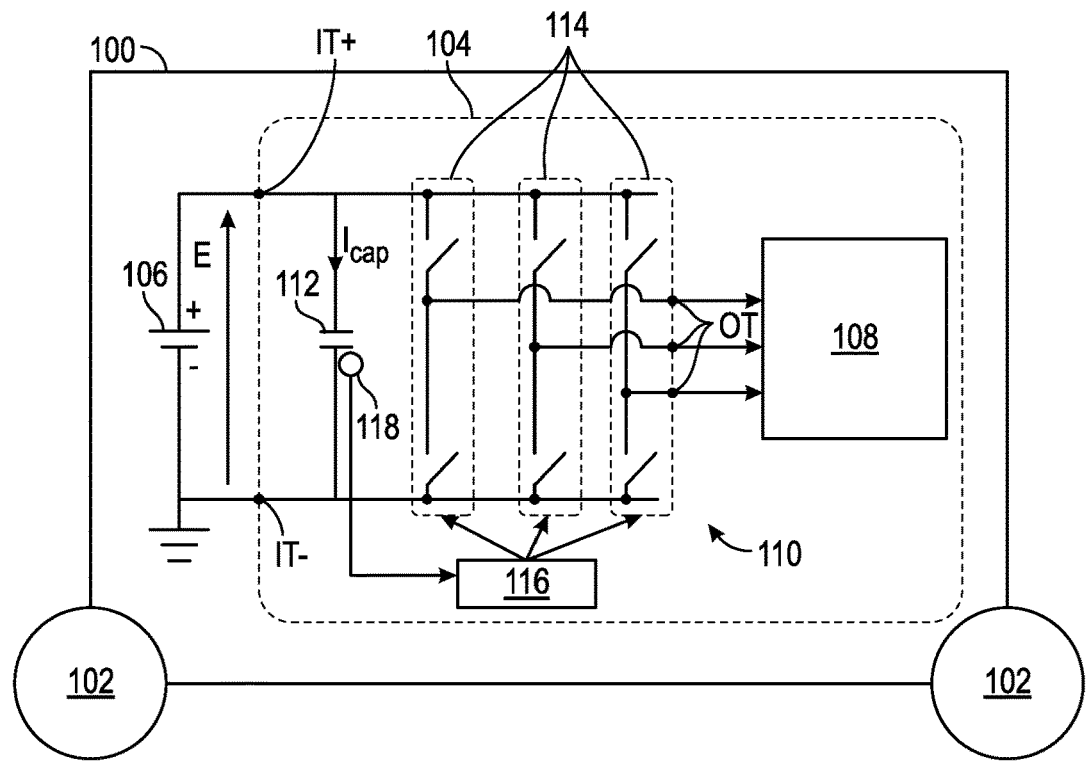

(51) Int. Cl.
*H02M 7/5387* (2007.01)
*H02M 7/5395* (2006.01)
*H02M 7/48* (2007.01)

(52) U.S. Cl.
CPC ....... *H02M 7/5387* (2013.01); *H02M 7/5395* (2013.01); *H02M 7/48* (2013.01)

(56) References Cited

U.S. PATENT DOCUMENTS

| | | | | |
|---|---|---|---|---|
| 6,236,172 | B1* | 5/2001 | Obara | B60L 50/51 |
| | | | | 318/722 |
| 8,674,637 | B2* | 3/2014 | Kamijo | B60L 58/25 |
| | | | | 180/65.21 |
| 9,906,168 | B2* | 2/2018 | Katayama | H02M 7/5395 |
| 10,924,032 | B2* | 2/2021 | Burgermeister | H02M 7/5395 |
| 11,262,221 | B2* | 3/2022 | Sahhary | H02P 6/16 |
| 11,355,939 | B2* | 6/2022 | Edelhäuser | H02M 1/32 |
| 11,539,320 | B2* | 12/2022 | Wiedmann | H02M 7/538466 |
| 2007/0216344 | A1* | 9/2007 | Welchko | H02P 27/04 |
| | | | | 318/811 |
| 2007/0296357 | A1* | 12/2007 | Song | H02P 23/07 |
| | | | | 318/139 |
| 2009/0108794 | A1* | 4/2009 | Ochiai | H02M 7/53875 |
| | | | | 363/132 |
| 2010/0185350 | A1* | 7/2010 | Okamura | H02M 1/327 |
| | | | | 701/22 |
| 2012/0256580 | A1* | 10/2012 | Yu | H02P 29/032 |
| | | | | 318/779 |
| 2012/0300523 | A1* | 11/2012 | Sugiyama | H02M 1/15 |
| | | | | 363/131 |
| 2013/0033914 | A1* | 2/2013 | Yahata | H02M 7/48 |
| | | | | 363/132 |
| 2013/0063061 | A1* | 3/2013 | Hanada | H02P 29/62 |
| | | | | 318/400.14 |
| 2014/0028238 | A1* | 1/2014 | Tsukamoto | H02P 1/022 |
| | | | | 318/504 |
| 2014/0268954 | A1* | 9/2014 | Wei | H02M 7/219 |
| | | | | 363/89 |
| 2014/0350871 | A1* | 11/2014 | Krefta | G01R 21/133 |
| | | | | 702/60 |
| 2015/0016170 | A1* | 1/2015 | Olarescu | H02M 7/537 |
| | | | | 363/132 |
| 2015/0340982 | A1* | 11/2015 | Deflorio | H02P 27/08 |
| | | | | 363/132 |
| 2015/0357934 | A1* | 12/2015 | Hirsch | H02P 29/68 |
| | | | | 363/95 |
| 2016/0373047 | A1* | 12/2016 | Loken | H02M 7/53875 |
| 2017/0070172 | A1* | 3/2017 | Je | H02P 6/17 |
| 2017/0187320 | A1* | 6/2017 | Kanie | H02M 7/5395 |
| 2017/0219441 | A1* | 8/2017 | Doppelhammer | H02M 5/458 |
| 2017/0361732 | A1* | 12/2017 | Grubic | H02P 21/22 |
| 2019/0173395 | A1* | 6/2019 | Huettinger | B60L 3/003 |
| 2020/0021227 | A1* | 1/2020 | Lee | H02P 27/085 |
| 2020/0251982 | A1* | 8/2020 | Foube | H02M 1/32 |
| 2022/0094259 | A1* | 3/2022 | Cui | H02M 1/088 |
| 2022/0149768 | A1* | 5/2022 | Rambetius | H02P 29/66 |
| 2022/0200482 | A1* | 6/2022 | Makimura | H02P 29/62 |
| 2022/0247337 | A1* | 8/2022 | Harada | H02P 21/18 |
| 2022/0255487 | A1* | 8/2022 | Wolf | H02P 27/085 |
| 2023/0060086 | A1* | 2/2023 | Yano | G01R 19/32 |

FOREIGN PATENT DOCUMENTS

| | | |
|---|---|---|
| DE | 102018204227 A1 | 9/2019 |
| DE | 102019214536 A1 | 3/2021 |

OTHER PUBLICATIONS

Weber Maximilian et al.; "A Novel Approach for Real-Time Monitoring of Power Losses of DC-Link Capacitors in Traction Inverters Subject to Various Periodic Modulation Strategies;" 2020 26th International Workshop on Thermal Investigations of ICS and Systems (Therminic), IEEE; Sep. 14, 2020; pp. 37-42 (6 pages).

Yao Fang et al.; "Impact of Modulation Schemes on DC-Link Capacitor of VSI in HEV Applications;" 2017 IEEE International Electric Machines and Drives Conference (IEMDC), IEEE; May 21, 2017; pp. 1-7 (7 pages).

Extended European Search Report issued in European Application No. 21196253.5, mailed on Feb. 21, 2022 (10 pages).

* cited by examiner

INVERTER, METHOD FOR CONFIGURING AN INVERTER, METHOD FOR CONTROLLING AN INVERTER AND CORRESPONDING COMPUTER PROGRAM FOR PREVENTING AN OVERHEATING OF A DC LINK CAPACITOR

The present invention relates to an inverter, a method for configuring an inverter, a method for controlling an inverter and a corresponding computer program. The present invention also relates to an electric drive and to a vehicle. The present invention is especially intended to be used in an automotive vehicle, for example to supply electrical power to an electrical drive motor of the vehicle.

Inverters are used to generate an AC voltage from a DC voltage provided, for instance, from a battery. Usually, the inverter comprises a DC link capacitor to smooth the DC voltage.

During operation of the inverter, the DC link capacitor may heat up, potentially mitigating a reliable operation of the inverter.

An object of the invention is to provide means for preventing an overheating of a DC link capacitor of an inverter.

The object of the invention is solved by means of an inverter comprising:
  input terminals,
  output terminals,
  a DC link capacitor connected to the input terminals and configured to smooth a DC voltage present at the input terminals,
  controllable switches connected to the DC link capacitor and to the output terminals, and
  a control device configured to control the controllable switches such that the controllable switches convert the DC voltage into an AC voltage to be present at the output terminals, the control device being configured to control the controllable switches according to a first switching control scheme including a first modulation technique and a first switching frequency of the controllable switches, and to control the controllable switches according to a second switching control scheme in response to a temperature of the DC link capacitor, the second switching control scheme causing less losses in the DC link capacitor than the first switching control scheme.

The inverter comprises the controllable switches which are for example controllable semiconductor switches, for instance, IGBTs, as it is commonly known in the relevant art, and are configured to convert the DC voltage into the AC voltage. The DC voltage is provided, for instance, by a battery. The AC voltage is present at the output terminals of the inverter and may be a single or a multiphase AC voltage. In particular, the AC voltage may be a three-phase AC voltage.

The AC voltage is generated from the DC voltage by appropriately turning on and off the controllable switches by an appropriate switching control scheme. The controllable switches are controlled by the control device which may, for instance, comprise a microcontroller or a microprocessor.

In order to smooth the DC voltage present at the input terminals, the inverter comprises the DC link capacitor. During operation of the inverter, the DC link capacitor heats up, for instance, due to the current flowing through it, resulting in losses.

The losses of the DC link capacitor may depend, inter alia, on the applied switching control scheme for the controllable switches.

In order to prevent an overheating of the DC link capacitor, the control device is configured to control the controllable switches according to the first switching control scheme and to the second switching control scheme in response to the temperature of the DC link capacitor. The first switching control scheme includes a first modulation technique and a first switching frequency, and the second switching control scheme causes less losses in the DC link capacitor than the first switching control scheme.

The control device of the inverter may be configured to change controlling the controllable switches according to the first switching control scheme to the second switching control scheme in response to the temperature of the DC link capacitor, in particular when the temperature of the DC link capacitor exceeds a predefined temperature.

One aspect of the invention is directed to method for controlling the inventive inverter, comprising the following steps:
  controlling the controllable switches according to the first switching scheme,
  obtaining the temperature of the DC link capacitor, and
  changing controlling the controllable switches from the first to the second switching control scheme in response to the temperature of the DC link capacitor, in particular when the temperature of the DC link capacitor exceeds a predefined temperature.

Thus, the switching control scheme is changed from the first switching control scheme to the second switching control scheme in response to the temperature of the DC link capacitor, in particular when this temperature exceeds the predefined temperature. Consequently, if the temperature of the DC link capacitor exceeds the predefined temperature, the controllable switches are operated by the second switching control scheme which causes less losses of the DC link capacitor, potentially mitigating the risk of overheating the DC link capacitor.

The second switching control scheme causes less losses of the DC link capacitor than the first switching control scheme but may, however, cause an inferior performance of the inverter or an electric drive comprising the inverter and an electric motor powered by the inverter.

The inverter may comprise at least one temperature sensor, coupled to the control device, for measuring the temperature of the DC link capacitor. The inverter, however, may be configured to estimate the temperature of the DC link capacitor, for instance, by monitoring the current flowing into the DC link capacitor and/or by monitoring the current(s) of the output terminals of the inverter.

In order to estimate the temperature of the DC link capacitor, the inverter, in particular its control device may comprise a temperature model of the DC link capacitor, which, for instance, calculates a temperature difference to a certain reference temperature, which is measured, for instance, by means of a sensor. The measured temperature may, for instance, the temperature of a cooling fluid used to cool the controllable switches and/or to cool the DC link capacitor.

Preferred, the control device is configured to control the controllable switches according to a second switching control scheme in response to the actual temperature of the DC link capacitor, the second switching control scheme causing less losses in the DC link capacitor than the first switching control scheme. The actual temperature of the DC link capacitor may be measured by means of the aforementioned temperature sensor or by estimating the actual temperature, for instance, by means of the aforementioned temperature model of the DC link capacitor.

The temperature of the DC link capacitor may, however, be an increase of its temperature which may, for instance, be estimated by an appropriate model based, for instance, on the current through the DC capacitor or based on the output currents of the inverter. In particular, this model may be a $I^2t$-model, which is an integral over the square of the DC-current of the DC link capacitor or the output current of the inverter. This imitates Ohm's law, but does not directly calculate a temperature.

The losses of the DC link capacitor may depend not only on the current flowing through the DC link capacitor, but also on an equivalent series resistance of the DC link capacitor. Such equivalent series resistance is frequency dependent. It results that the shape of the frequency spectrum of the current flowing through the DC link capacitor has an impact on its losses. As a consequence, by changing the frequency spectrum, the losses and hence the temperature of the DC link capacitor can be reduced. The frequency dependency of the equivalent series resistance may, therefore, be taken into account by controlling the controllable switches during the second switching control scheme.

Thus, a frequency spectrum of the current flowing through the DC link capacitor during the first switching control scheme may differ during the second switching control scheme.

The second switching control scheme may include a second switching frequency for controlling the controllable switches, less than the first switching frequency, allowing to reduce the losses of the DC link capacitor to be reduced during the second switching control scheme in a relatively cost effective way.

The second switching control scheme may include a second modulation technique for controlling the controllable switches different form the first modulation technique. The first modulation technique may include or is a first space vector modulation technique and the second modulation technique may include or is a second space vector modulation technique different from the first space vector modulation technique. Such switching control scheme may also be implemented in a relatively easy manner The second modulation technique may particularly be a flat top modulation technique, which allows an operation causing relatively little losses of the DC link capacitor Preferably, the control device may be configured to change the switching control scheme from the first to the second switching control scheme while keeping a constant current and/or voltage at the AC terminal or AC terminals. Then, a torque provided by the electric motor can remain unchanged Also optionally, changing the switching control scheme may comprise reducing the switching frequency. Such a feature provides a simple and cost effective manner to change the frequency spectrum of the DC link capacitor current so that the losses in the DC link capacitor may be reduced.

Also optionally, changing the switching control scheme may comprise changing the modulation technique, for instance by switching from a space vector modulation technique to another modulation technique such as a flat top modulation technique. Such a feature provides an efficient manner to change the frequency spectrum of the DC link capacitor current so that the losses in the DC link capacitor are reduced, in particular when the switching frequency cannot be reduced further.

Also optionally, independently from or in combination with the previous features, the inverter may further comprise at least one sensor for measuring a physical quantity different from the temperature of the DC link capacitor, and the control device may be configured for receiving measures of the at least one sensor and estimating the temperature of the DC link capacitor from the received measures.

The invention also relates to a method for configuring the inverter, comprising the following steps:
determining an equivalent series resistance of the DC link capacitor as a function of the frequency of the DC link capacitor current,
determining the frequency spectrum of the DC link capacitor current for several switching control scheme having different modulation techniques and/or different switching frequencies,
for each switching control scheme, estimating losses of the DC link capacitor according to the equivalent series resistance and the frequency spectrum of the considered switching control scheme, and
configuring the control device for switching, according to the obtained temperature, from one of said switching control schemes to another one leading to fewer estimated losses.

Then it is possible to determine a relatively good, if not optimal or most appropriate switching control scheme.

The invention also relates to a computer program downloadable from a communication network and/or recorded on a computer readable medium, comprising instructions for the execution of the steps of a method according to the invention for controlling an electrical converter system, when said program is executed on a computer.

Figure 2:
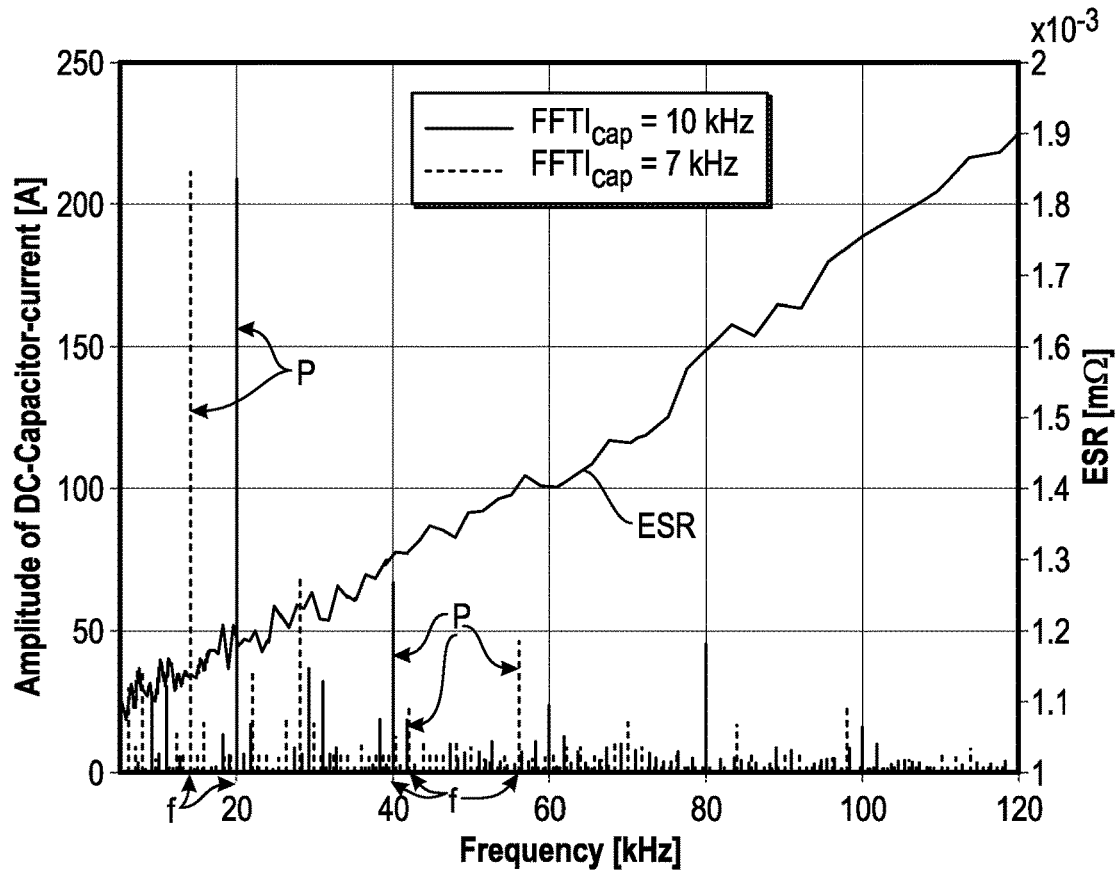
Figure 3:
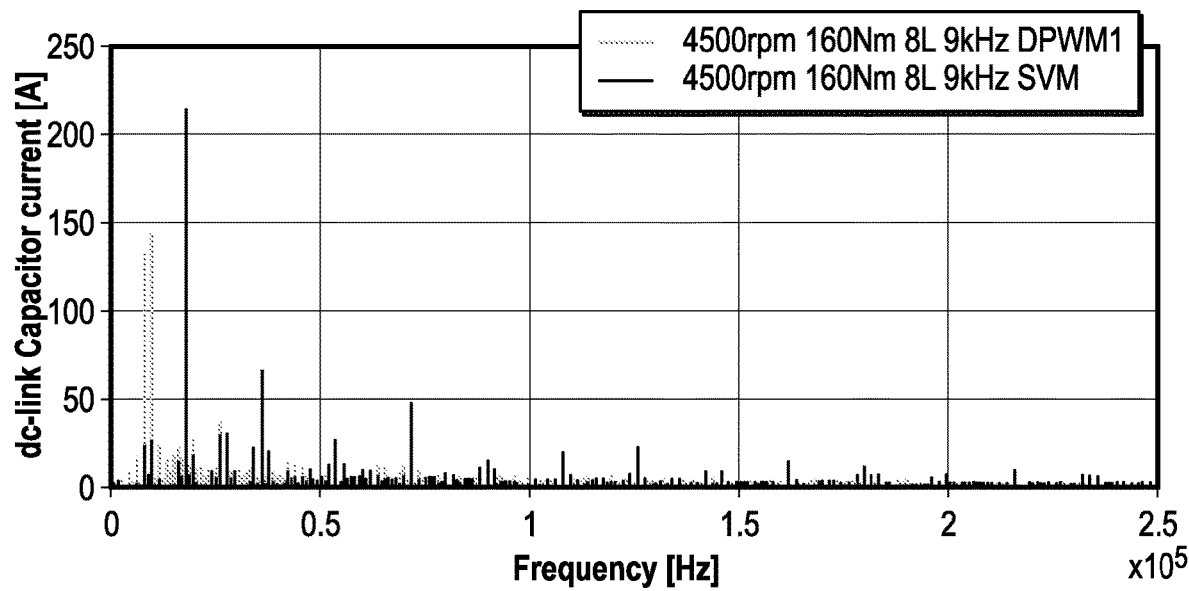

The present invention will be described more specifically with reference to the accompanying drawings, in which:

FIG. 1 is a schematic view showing an embodiment of an automotive vehicle comprising an inverter according to the invention, FIG. 2 is a graph showing an equivalent series resistance of a DC link capacitor of the inverter and a current in the DC link capacitor, both versus frequency, and FIG. 3 is a graph showing the current in the DC link capacitor versus frequency, for two modulation techniques used in the inverter.

Referring to FIG. 1, a vehicle 100 according to the invention will now be described. In the described example, the vehicle 100 is an automotive vehicle.

The vehicle 100 comprises wheels 102 and an electric drive 104 configured to drive at least one of the wheels 102 at least indirectly. The vehicle 100 further comprises a DC voltage source 106, such as a battery, for electrically powering the electric drive 104. The DC voltage source 106 is configured to provide a DC voltage E.

The electric drive 104 comprises an electric motor 108 and an inverter 110 configured to drive the electric motor 108, for instance, by supplying electric power. For example, the electric motor 108 is a rotary electric motor comprising stator phases. In the described example, the electric motor 108 is a three-phase electric motor comprising three stator phases.

The inverter 110 comprises input terminals IT+, IT− connected to the DC voltage source 106 so that the DC voltage E is present at the input terminals IT+, IT−. More precisely, the input terminals IT+, IT− include a positive input terminal IT+ connected to a positive terminal of the DC voltage source 106 and a negative input terminal IT− connected to a negative terminal of the DC voltage source 106.

The inverter 110 further comprises a DC link capacitor 112 connected to the input terminals IT+, IT−. The DC link capacitor 112 is configured to smooth the DC voltage E (e.g. limit voltage overshoots). In operation, a current $I_{cap}$ is intended to flow through the DC link capacitor 112.

The inverter 110 further comprises output terminals OT connected to the electric motor 108. An AC voltage is intended to be present at the output terminals OT for powering the electric motor 108. The AC voltage may be a single or a multiphase AC voltage. In the described example where the electric motor 108 is a three-phase electric motor, the AC voltage is a three-phase AC voltage.

The inverter 110 further comprises controllable switches connected to the DC link capacitor 112 and to the output terminals. The controllable switches may be semi-conductor switches comprising for example transistors. The controllable switches are for example Metal Oxide Semiconductor Field Effect Transistor (MOSFET) and/or Insulated Gate Bipolar Transistor (IGBT).

In the described example, the inverter 110 comprises switch legs 114 respectively associated to the stator phases of the electric motor 108. Each switch leg 114 comprises a high side (HS) controllable switch connected to the positive input terminal IT+ and a low side (LS) controllable switch connected to the negative input terminal IT−. The HS controllable switch and the LS controllable switch are connected to each other at a middle point connected to the output terminal OT connected to the associated stator phase of the electric motor 108.

Each switch leg 114 is intended to be controlled to switch between two configurations. In the first one, called high side (HS) configuration, the HS controllable switch is closed and the LS controllable switch is open so that the DC voltage E is essentially applied to the associated stator phase. In the second one, called low side (LS) configuration, the HS controllable switch is open and the LS controllable switch is closed so that a zero voltage is essentially applied to the associated stator phase.

The inverter 110 further comprises a control device 116 configured to control the controllable switches such that the controllable switches convert the DC voltage E into the AC voltage. For example, the AC voltage oscillates at an output frequency $f_{el}$.

More precisely, the control device 116 is configured to control the controllable switches according to a first switch control scheme including a first modulation technique and a first switching frequency of the controllable switches. The first modulation technique includes or is for example a pulse width modulation (PWM) technique. The switching frequency is typically the inverse of the period of time it takes to complete an on-and-off cycle of the PWM technique for each switch.

In the described example, the control device 116 is configured to commute each switch leg 114 between the two configurations mentioned above.

The control device 116 is further configured to obtain a temperature of the DC link capacitor 112.

In a first embodiment, the inverter 110 comprises at least one temperature sensor 118 for measuring the temperature of the DC link capacitor 112. Each temperature sensor 118 is coupled to the control device 116 and the control device 116 is configured to receive the measured temperature of the DC link capacitor 112.

In a another embodiment which may be combined with the previous one, the inverter 110 may be configured to estimate the temperature of the DC link capacitor 112, for instance, by monitoring the current flowing into the DC link capacitor and/or by monitoring the current(s) of the output terminals OT of the inverter 110.

The control device 116 is then configured to receive measures of the physical quantity from the sensor(s), and to estimate the temperature of the DC link capacitor 112 from the received measures.

The control device 116 is further configured to control the controllable switches according to a second switching control scheme in response to the temperature of the DC link capacitor 112. The second switching control scheme causes less losses in the DC link capacitor 112 than the first switching scheme.

For example, the control device 116 is configured to go from controlling the controllable switches according to the first switching control scheme to controlling the controllable switches according to the second switching control scheme when the temperature of the DC link capacitor 112 exceeds a predefined temperature.

Referring to FIG. 2, a frequency spectrum of the DC link capacitor current $I_{Cap}$ is illustrated, with a switching frequency of 7 kHz (doted lines) and with of a switching frequency of 10 kHz (solid lines), both with the same modulation technique, namely a vector space modulation technique. As apparent on FIG. 2, the frequency spectrum comprises peaks P at certain frequencies f, each peak P having an amplitude noted (f). For clarity reasons, only some peaks are designated with references P and f on FIG. 2.

In particular, the peak frequencies f includes frequencies depending on the switching frequency, noted $f_{PWM}$, and on the output frequency $f_{el}$ of the AC voltage, according to the following formula: (1) $f=k*f_{PWM}\pm 3*n*f_{el}$, with k= 1,2,3,4,5, . . . and n=0,1,2.

Also on FIG. 2, an evolution with frequency of an equivalent series resistance (ESR) of the DC link capacitor 112 is illustrated. As apparent on FIG. 2, the ESR generally increases with the frequency.

As mentioned above, the DC link capacitor 112 produces losses $P_L$, depending on the DC link capacitor current $I_{Cap}$. The losses $P_{L,Cap}$ can be approximately calculated by multiplying, for each peak frequency f, the square of the amplitude $I_{Cap}(f)$ of the capacitor current $I_{Cap}$ at this peak frequency f, with the ESR of the DC link capacitor 112 at this peak frequency f, noted $R_{ESR}(f)$, according to the following formula: (2) $P_{L,Cap}=\Sigma R_{ESR}(f)*I_{Cap}(f)^2$.

As a consequence, in order to decrease the losses $P_L$, the amplitude of the peaks P should be reduced and/or the peak frequencies should be shifted towards the low frequencies.

Therefore, in a first embodiment, the second switching control scheme includes a second switching frequency 108 less than the first switching frequency.

Indeed, as apparent on FIG. 2, the frequency spectrum of the DC link capacitor current $I_{Cap}$ with a switching frequency of 7 kHz (doted lines) only contains peaks at lower frequencies compared to the frequency spectrum of the DC link capacitor current with a switching frequency of 10 kHz (solid lines). The ESR implied in the calculation of the losses are hence reduced and so the losses themselves.

In another embodiment which may be combined with the previous one, the second switching control scheme includes a second modulation technique different from the first modulation technique. Preferably, the first modulation technique includes or is a space vector modulation technique and the second modulation technique includes or is a second space vector modulation technique different from the first space vector modulation technique. For example, the second modulation technique is a discontinuous pulse width modulation technique, for example a flat top modulation technique or GDPWM (Generalized Discontinuous PWM which is another (more efficient) type of DPWM technique.

Referring to FIG. 3, the frequency spectrum of the DC link capacitor current is shown for a space vector modulation technique (SVM); dotted lines and a flat top modulation technique (DPWM1); solid lines for a same switching frequency of 9 kHz and same operational conditions. As apparent on FIG. 3, the peak frequencies of the first modulation technique are lower than the peak frequencies of the second modulation technique. As above, the ESR implied in the calculation of the losses is hence reduced and so the losses themselves and the temperature of the DC link capacitor 112.

The control device 116 is preferentially configured to change the switching control scheme from the first to the second switching control scheme while keeping a constant current and/or voltage at the AC terminal or AC terminals.

The control device 116 may be a computer system, such as a microcontroller. The computer system may comprise a data processing unit (such as a microprocessor) and a main memory (such as a RAM memory, standing for "Random Access Memory") accessible by the processing unit. The functions of the control device 116 may be implemented by computer program containing instructions for the processing unit. This computer program is for example intended to be loaded into the main memory, so that the processing unit executes its instructions.

Alternatively, all or part of these functions could be implemented in the form of hardware modules, i.e. in the form of an electronic circuit, for example micro-wired, not involving a computer program. For example, the control device 116 could comprise a Field-programmable gate array (FPGA).

A method for configuring the inverter 110 will now be described. The method comprises the following steps:
- determining an equivalent series resistance of the DC link capacitor 112 as a function of the frequency of the DC link capacitor current $I_{Cap}$,
- determining the frequency spectrum of the DC link capacitor current $I_{Cap}$ for several switching control schemes having different modulation techniques and/or different switching frequencies,
- for each switching control scheme, estimating losses of the DC link capacitor 112 according to the equivalent series resistance and the frequency spectrum of the considered switching control scheme, and
- configuring the control device 116 for switching, in response to the temperature of the DC link capacitor 112, from one of said switching control scheme to another one leading to fewer estimated losses.

The inverter 110 may be configured according to the previous method before operational use.

Thanks to such configuration, it is possible to choose a relatively good, if not optimal or most appropriate switching control scheme, for example depending on operating conditions of the inverter 110 and/or electric motor 108.

It will be noted that the invention is not limited to the embodiments described above. It will indeed appear to those skilled in the art that various modifications can be made to the embodiments described above, in the light of the teaching which has just been disclosed.

In the previous detailed description of the invention, the terms used should not be interpreted as limiting the invention to the embodiments presented in the present description, but should be interpreted to include all the equivalents within the reach of those skilled in the art by applying their general knowledge to the implementation of the teaching which has just been disclosed.

The invention claimed is:

1. An inverter comprising:
   input terminals;
   output terminals;
   a DC link capacitor connected to the input terminals and configured to smooth a DC voltage present at the input terminals;
   controllable switches connected to the DC link capacitor and to the output terminals; and
   a control device configured to:
      control the controllable switches such that the controllable switches convert the DC voltage into an AC voltage to be present at the output terminals,
      control the controllable switches according to a first switching control scheme including a first modulation technique and a first switching frequency of the controllable switches,
      control the controllable switches according to a second switching control scheme in response to a temperature of the DC link capacitor, the second switching control scheme including a second modulation technique and causing less losses in the DC link capacitor than the first switching control scheme,
      wherein the first modulation technique incudes a first space vector modulation technique and the second modulation technique includes a second space vector modulation technique that is different from the first space vector modulation technique, and
      wherein the first modulation technique is a pulse width modulation (PWM) technique and the second modulation technique is a flat top modulation technique,
      control the controllable switches according to the first switching control scheme,
      obtain the temperature of the DC link capacitor, and
      change controlling the controllable switches from the first switching control scheme that includes the first space vector modulation technique to the second switching control scheme that includes the second space vector modulation technique, in response to the temperature of the DC link capacitor when the temperature of the DC link capacitor exceeds a predefined temperature.

2. The inverter according to claim 1, wherein the control device is further configured to change controlling the controllable switches from the first switching control scheme to the second switching control scheme in response to the temperature of the DC link capacitor when the temperature of the DC link capacitor exceeds the predefined temperature, and wherein a frequency spectrum of a current flowing through the DC link capacitor during the first switching control scheme differs during the second switching control scheme.

3. The inverter according to claim 1, wherein the second switching control scheme further includes a second switching frequency for controlling the controllable switches, wherein the second switching frequency is less than the first switching frequency.

4. The inverter according to claim 1, further comprising at least one temperature sensor coupled to the control device for measuring the temperature of the DC link capacitor.

5. The inverter according to claim 1, wherein the control device is configured to change the switching control scheme from the first switching control scheme to the second switching control scheme while keeping at least one of a constant current and a constant voltage at an AC terminal or AC terminals.

6. An electric drive comprising: the invertor of claim 1; and an electric motor driven by the inverter.

7. A vehicle comprising: wheels; and the electric drive of claim 6 configured to indirectly or directly drive at least one of the wheels.

8. A method for configuring the inverter as claimed in claim 1, comprising:
  determining an equivalent series resistance of the DC link capacitor as a function of a frequency of a DC link capacitor current;
  determining a frequency spectrum of the DC link capacitor current for several switching control schemes having at least one of different modulation techniques and different switching frequencies, wherein the different modulation techniques including the first modulation technique and the second modulation technique and the different switching frequencies including the first switching frequency and a second switching frequency;
  for each switching control scheme, estimating losses of the DC link capacitor according to the equivalent series resistance and the frequency spectrum of a considered switching control scheme; and
  configuring the control device for switching, in response to the temperature of the DC link capacitor, from one of said switching control schemes to another one leading to fewer estimated losses.

9. A non-transitory computer program downloadable from a communication network or recorded on a computer readable medium, comprising instructions for execution of a method for controlling the inverter according to claim 1, when said program is executed on a computer.

10. The inverter according to claim 1, wherein the losses in the DC link capacitor depend on a current flowing through the DC link capacitor and an equivalent series resistance of the DC link capacitor.

* * * * *